United States Patent
Petrucelli

(10) Patent No.: US 8,244,659 B2
(45) Date of Patent: Aug. 14, 2012

(54) IMMIGRATION APPLICATION MANAGEMENT APPARATUS, SYSTEMS, AND METHODS

(76) Inventor: Michael Petrucelli, Bethesda, MD (US)

(*) Notice: Subject to any disclaimer, the term of this patent is extended or adjusted under 35 U.S.C. 154(b) by 499 days.

(21) Appl. No.: 12/456,195

(22) Filed: Jun. 12, 2009

(65) Prior Publication Data

US 2009/0313200 A1 Dec. 17, 2009

Related U.S. Application Data

(60) Provisional application No. 61/132,066, filed on Jun. 16, 2008.

(51) Int. Cl.
*G06F 17/00* (2006.01)
*G06Q 10/00* (2006.01)

(52) U.S. Cl. .......................... 706/45; 705/1.1

(58) Field of Classification Search .................. None
See application file for complete search history.

(56) References Cited

U.S. PATENT DOCUMENTS

| | | | |
|---|---|---|---|
| 6,366,925 B1 * | 4/2002 | Meltzer et al. | 705/6 |
| 6,898,574 B1 | 5/2005 | Regan | 705/38 |
| 6,988,073 B2 | 1/2006 | Dutta et al. | 705/1 |
| 2002/0029194 A1 * | 3/2002 | Lewis et al. | 705/39 |
| 2002/0055937 A1 | 5/2002 | Walther | |
| 2002/0147607 A1 * | 10/2002 | Thakur et al. | 705/1 |
| 2005/0167484 A1 | 8/2005 | Sussman | |
| 2006/0095316 A1 | 5/2006 | Stevenson et al. | 705/11 |
| 2007/0106592 A1 | 5/2007 | Messier | 705/36 |
| 2008/0167985 A1 | 7/2008 | Yarnall | 705/39 |
| 2009/0083173 A1 | 3/2009 | Hu et al. | 705/35 |

* cited by examiner

*Primary Examiner* — Alan Chen

(57) ABSTRACT

Application management apparatus, systems, and methods to process government agency forms and applications such as, for example, immigration forms, petitions and applications to increase the likelihood of acceptance.

21 Claims, 4 Drawing Sheets

Backlog Totals & Cycle Time

| Form Name | Form Number | End of 3rd Quarter FY 2006 Cycle Time | End of FY 2006 Target Cycle Time | End of 3rd Quarter FY 2006 Backlog |
|---|---|---|---|---|
| Application to Adjust Status (Non-Abeyance Cases) | I-485 | 8.32 | 6 | 99,588 |
| Application to Adjust Asylee Status | I-485 | n/a | 6 | 0 |
| Petition for Nonimmigrant Worker | I-129 | 1.82 | 2 | 0 |
| Application to Extend/Change Status | I-539 | 2.99 | 3 | 0 |
| Application to Replace Permanent Resident Card | I-90 | 2.90 | 6 | 0 |
| Petition for Alien Relative (Visa Available Only) | I-130 | 8.34 | 6 | 72,047 |
| Application for Travel Document - Advanced Parole | I-131 Adv/Prl | 2.18 | 3 | 0 |
| Application for Travel Document - Reentry Permit | I-131 RP/RD | 2.03 | 3 | 0 |
| Immigration Petition for Alien Worker | I-140 | 3.30 | 6 | 0 |
| Petition to Remove Conditions on Residence | I-751 | 5.18 | 6 | 0 |
| Application for Employment Authorization | I-765 | 1.94 | 3 | 0 |
| Application for Temporary Protected Status | I-821 | 1.62 | 6 | 0 |
| Application for Naturalization | N-400 | 5.79 | 7 | 0 |
| Application for Certificate of Citizenship | N-600 & N-643 | 7.28 | 6 | 5,766 |
| Asylum Application | I-589 | 8.07 | 6 | 15,214 |
| NACARA 203 Application | I-881 | 4.69 | 6 | 0 |
| Credible Fear Referral | I-867 | 0.68 | <1 | 77 |
| | | | TOTAL | 192,691 |

Fig. 1

IMMIGRATION APPLICATION MANAGEMENT APPARATUS, SYSTEMS, AND METHODS

RELATED APPLICATION

This application is a non-provisional application of prior U.S. Provisional Patent Application Ser. No. 61/132,066, filed Jun. 16, 2008, which is herein incorporated by reference in its entirety.

FIELD

Embodiments of the present invention relate in general to the field of computer systems, apparatus, and computer-implemented methods, and in particular to immigration application management systems, apparatus, and methods.

BACKGROUND

The U.S. government's E-filing initiative is designed to increase the number of filings (either required or for discretionary benefits) that may be accomplished via the Internet without benefit of an exchange of actual paper. This initiative falls under the broader rubric of E-Government—the latter being the sum of all the features available on-line through U.S. federal and state government websites. The Internal Revenue Service was among the first federal agencies in the United States to embrace e-filing on a large scale. Other present-day large government users of e-filing applications include: the U.S. Postal Service, the Social Security Administration, the Department of State, the Department of Veterans Affairs, the Department of Education, the Department of Housing and Urban Development, and the Department of Homeland Security. Within the Department of Homeland Security, the component entity U.S. Citizenship and Immigration Services (USCIS) currently processes most immigration applications and filings.

According to the 2007 Taubman Center for Public Policy (Brown University) E-Government report, 86 percent of federal and state websites now offer fully executable online services—up from 77 percent in 2006. The top five states for E-Government were: (1) Delaware, (2) Michigan, (3) Maine, (4) Kentucky, and (5) Tennessee. In the federal space, the Social Security Administration was ranked $4^{th}$ out of 50 major federal agencies and departments, and the Department of Homeland Security was ranked $26^{th}$.

When it comes to filing immigration applications with the U.S. Government, the process may be very difficult and overwhelming. This is especially true with the recent changes the U.S. Government has made with the way immigration is handled. In June of 2002, the U.S. Congress received a request from the President of the United States to transfer the personnel and functions of the Immigration and Naturalization Service (INS) from the Department of Justice to the newly conceived Department of Homeland Security (DHS). On Mar. 1, 2003, the relevant changes to U.S. law took effect and INS personnel and functions were, in fact, transferred to DHS. Unlike earlier transfers of immigration powers, however, such as the collective movement of the immigration function from the Treasury Department to the Labor Department in 1913, and the movement from the Department of Labor to the Department of Justice in 1940, in this instance the entire organization hitherto for responsible for all U.S. immigration functions (the INS) was formally disbanded, and ceased to exist.

Similarly, not only were the personnel and functions of the U.S. Customs Service transferred to DHS in 2003, but the Customs Service itself was formally disbanded, and ceased to exist. Within DHS, there are now three separately organized and structured entities that have some responsibility for certain immigration functions. The function of U.S. Citizenship and Immigration Services (USCIS) at DHS is to handle all U.S. immigration services and benefits, including citizenship, applications for permanent residence, non-immigrant applications, asylum, and refugee services.

USCIS is headed by a Director, who holds Undersecretary rank within DHS. U.S. immigration enforcement functions at the border, including inspection, are now handled by the DHS's Bureau of Customs and Border Protection (CBP), and interior enforcement of U.S. immigration laws, including detention and removal, are the responsibility of DHS's Bureau of U.S. Immigration and Customs Enforcement (ICE). CBP and ICE are headed by, respectively, an Assistant Secretary and a Commissioner (who also holds Assistant Secretary rank within DHS). Although USCIS is staffed in part, but not exclusively, by employees of the former INS, parts of the former U.S. Customs Service combined with the former Inspections Program of the INS, the former Plant Protection and Quarantine program from the U.S. Department of Agriculture (USDA), and the Border Patrol of the former INS to form US Customs and Border Protection, and the Federal Protective Service, along with the investigative arms of the former U.S. Customs Service and the former INS combined to form US Immigration and Customs Enforcement, USCIS, CBP and ICE are not direct successor organizations to any prior organization within the U.S. government. In contrast, other DHS component entities such as the U.S. Coast Guard and the U.S. Secret Service were transferred into DHS with their existing personnel, corporate charters, historical structures and organizational identities intact.

It is, therefore, evident that the process for navigating these different agencies and the forms required as well as the manner in which they should be answered and submitted is challenging. It is difficult for non-experts to navigate the multiplicity of forms and applications related to immigration petitions. Much like U.S. tax law, U.S. immigration law is lengthy, complex, and filled with apparent contradictions. Often, it is difficult to determine which applications would best be filed together, or sequentially, depending on individual circumstances.

Additionally, as in many areas of public policy, some recent state and local actions regarding immigration have been enacted in advance of federal requirements. In particular, many government entities below the federal level now require employers to check the immigration status of their employees. Current methods for doing so are inefficient and incomplete.

There is a need for a solution that addresses the above and other problems.

SUMMARY

Therefore, it is an aspect of one or more embodiments of the present invention to provide an apparatus, system and method for a user to use to determine the type of status, benefit or visa or other government benefit, document and/or award that is appropriate for the user, determine what forms should be filed, assist the user in providing appropriate responses to the questions in the forms, assist the user in determining what attachments, related documentation and fees are required and the sequence and timing for filing.

It is another aspect to improve the accuracy and speed in which a government document, immigration status, immigration benefit or visa, other government benefit or award is obtained.

It is another aspect to provide an apparatus, system and method whereby a government application, and/or an immigration application may be filled out correctly by a non-lawyer and minimize the time a lawyer must spend and the expense an applicant must pay to apply for a government document, government benefit, award, contract and/or an immigration status, benefit or visa.

In accordance with an aspect of the invention, a computer-implemented government application management method and system is provided that provides one or more questions on a computerized display device to a user wherein the one or more questions relate to questions relevant to a government application. The invention requests one or more answers corresponding to the one or more questions and then determines whether the one or more answers are acceptable to a government agency ultimately to receive the government application, and that the one or more answers will likely not result in a rejection or return of the government application. The invention provides guidance to the user to correct any unacceptable answers or suggest one or more appropriate answers. The invention uses a decision tree analysis to determine a form filing strategy based on the one or more answers and determines whether any other documents are required for or should be filed with the government application. The invention completes one or more forms based on the form filing strategy and assists the user with properly filing the forms and any other required documents.

The invention includes a computer-implemented immigration application management method and system.

BRIEF DESCRIPTION OF FIGURES

FIG. 1 is a chart of the fifteen U.S. immigration form types that currently constitute slightly more than 95 percent of all immigration filings.

DETAILED DESCRIPTION

Figure 2:
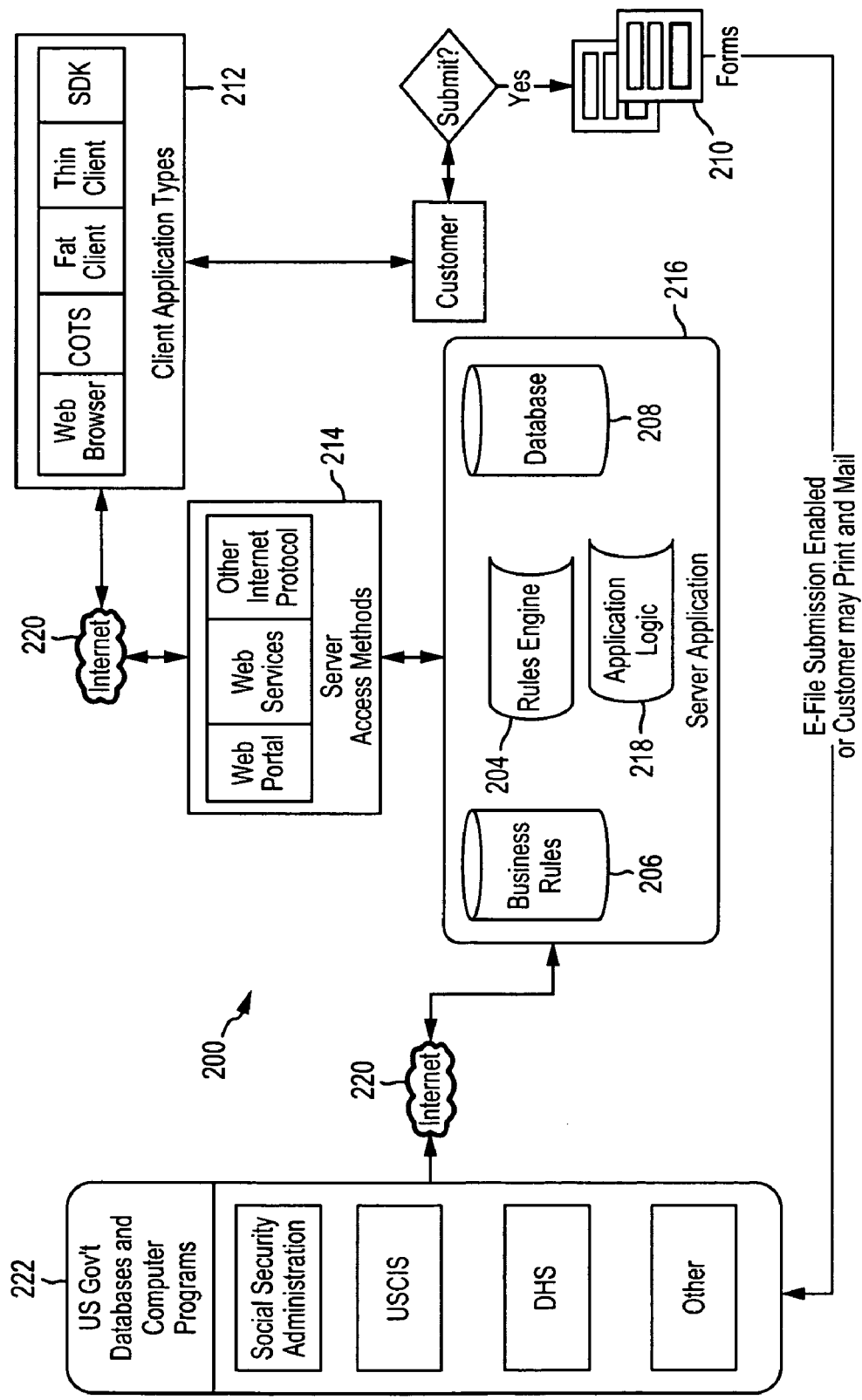
FIG. 2 is a schematic representation of an immigration application management system in accordance with an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

As used in this application, the terms "a", "an" and "the" may refer to one or more than one of an item. The terms "and" and "or" may be used in the conjunctive or disjunctive sense and will generally be understood to be equivalent to "and/or". For brevity and clarity, a particular quantity of an item may be described or shown while the actual quantity of the item may differ. Features from an embodiment may be combined with features of another. By way of non-limiting example, various components (e.g., rules engine 204, business rules 206, etc.) are described and shown which may perform various functions and interact with each other. These components may be separated based on their function merely for the sake of description and may represent computer hardware and executable software code which may be stored on a computer-readable storage medium for execution on appropriate computing hardware. The various functions of the different components may be combined or separated as hardware or software stored on a computer-readable storage medium in any manner, and may be used separately or in combination.

One or more embodiments of the present invention may be directed to apparatus, systems, and methods for obtaining a desired status, benefit, award or document with or from the government. The status, benefit, award and/or document may be obtained by an application process which may include the filling out and filing of forms, which may also include attachments and fees, in a government mandated manner. The term "application" as used herein is intended to additionally include the completion of a response to a government Request For Proposal (RFP). The term "forms" as used herein is intended to include government forms or government format documents. More specifically, embodiments may be directed to computer-readable storage media, systems, and computer-implemented methods that may, in an embodiment, link a user to a website and to the government in such a way that a user may determine the appropriate actions (e.g., the appropriate responses) to take to obtain a desired result. It should be noted at this point that the definition of an "appropriate response" and an "appropriate answer" may be a response that is accurate and that also would be accepted by a government reviewer. The terms "user" and "applicant" as used herein may be synonymous.

If the desired result is to obtain a immigration status, benefit or visa, the apparatus, systems, and methods may assist a user in identifying the correct type of status, benefit or visa, the forms required, the appropriate responses for the forms, the timing or sequence of filing the forms, any attachments or fees that may be required, signing the forms and submitting the forms to the government agency. Likewise, if the desired result is to complete another type of government application, such as, for example only, an application for taxpayer identification number, employer identification number, change of address, passport, social security number, social security benefit, request for birth certificate, request for marriage certificate, AR-11 change of address, immigration appointment, immigration status, zoning, driver's license, vehicle documents such as vehicle registration, vehicle license plates, to name a few, or response to a RFP, the system and method described herein will assist a user in identifying the correct type of application, forms required, the appropriate responses for the forms, the timing or sequence of filing the forms and any attachments or fees that may be required, signing the forms and submitting the forms to the government agency. The apparatus, systems, and methods may be updated contemporaneously with any changes or rule updates by the government and may notify the user of the appropriate actions required relative to the rule changes. A complete strategy may be determined by the apparatus, systems, and method, for executing and submitting appropriate forms to achieve the desired results (by way of non-limiting example, a particular immigration status, benefit, or visa).

The apparatus, systems, and method may also be used, under a program adopted by the U.S. government to attempt the "regularization" or registration of the approximately 12 to 14 million undocumented aliens living, and in most cases working, inside the territorial borders of the United States, to process applications or registrations from this defined group—particularly if any such program envisions a large-scale bureaucratic undertaking of limited duration. Specifically, the apparatus, systems, and methods could undertake operations or registrations that may include by way of non-limiting example: (1) processing proof of real identity that would meet current standards for secure identity documents, (2) processing proof of residence within the U.S. before to whatever standards may be specified, (3) taking fingerprints and other biometric records from applicants, (4) transmitting fingerprints and other biometric data to the relevant U.S. government organizations for law enforcement/intelligence screening and clearance, (5) collecting and processing a fee, and (6) providing a secure receipt or other documentation back to those aliens who meet the standards for registration (or whatever the benefit is called) when those aliens are approved. Because such a process may have to be undertaken in a geographic dispersal pattern across the United States that may or may not mirror the current location of U.S. Citizenship and Immigration Services (USCIS) or other U.S. Department of Homeland Security (DHS) or U.S. government offices or presences, a solution that is not geographically constrained, such as an embodiment of the present invention, may prove especially useful. In addition, an embodiment of the present invention may assist in relieving strain on full-time USCIS and DHS resources by completing, by way of non-limiting example, the above operations outside of formal adjudication systems. Doing so may maximize the non-inherently governmental functions of the above operations, and so not distract from the regular annual workflow cadence of USCIS and DHS.

FIG. 1 is a chart 100 showing the fifteen U.S. immigration form types 102 that currently constitute slightly more than 95 percent of all immigration filings. These form types 102, as well as others not listed, due to apparent contradictions in the laws necessitating the forms 102 and other forms, may often be incorrectly completed. In addition, they may also be incorrectly submitted to the U.S. Government.

FIG. 2 is a schematic representation of an immigration application management system 200 in accordance with an embodiment of the present invention. The system 200 may include a server application 216 connected to the Internet 220 via one or more server access methods 214. The system 200 may also include one or more client application types 212 connected to the Internet 220. The system 200 may be connected to one or more government databases 222 via the Internet 220.

The system 200 may be designed to guide users through a government application process in a step-by-step fashion using a question and answer methodology. The methodology may be based on an intricate set of business rules governed by decision tree analysis. The decision trees developed within the system 200 may provide both additional speed and additional reliability for end users who conduct immigration-related transactions with the one or more government databases 222 of government agencies/entities. The decision trees may be stored as a set of business rules 206 on computer readable storage medium and may be executed by a rules engine 204, which may be a computer and memory programmed with computer software. Further, the source data and decision trees in the system 200 may be fluid—constantly optimized and refined. Note that the business rules 206, the rules engine 204, and the database 208 may be located on the same computer or may be on separate computers. The server application 216 may include business rules 206, rules engine 204, database 208, and other application logic 218, including by way of non-limiting example, user management, workflows, and auditing.

The system 200 may utilize a database and "wizard" methodology (question and answer) to walk users through the decision making process of creating, processing, and submitting immigration-related applications and petitions. The database 208 may be an electronic computer database which stores data such as, by way of non-limiting example, customer account information, customer data, in-progress or incomplete customer transactions, immigration forms 210, and other government forms 210. By way of non-limiting example, the following types of information may be stored by the database 208 or other components of the system 200: applicant information including name, DOB, gender, etc., addresses of applicant's prior residences, employment history, names & addresses of family members, scanned documents—police reports, identification cards, etc., digital data—fingerprint scans, retinal scans, digital pictures, etc.; business rules (the herein discussed decision trees); and, data licensed to by used by the system 200 from third-party providers, including Dunn & Bradstreet company financial data, data mappings of geospatial coordinates to zip codes, and title & salary data. The computer implemented immigration application can store such information and normalize answers containing this information in corresponding fields.

The wizard methodology and decision tree analysis may assist and suggest the user in the selection of the proper type of status, benefit or visa and the correct forms 210 that correspond to the correct status, benefit or visa. It should be understood that there may be many types of status, benefit or visas that are available and the correct status, benefit or visa depends on the individual circumstances and needs of the applicant. Users may be shown the actual form or forms 210 and asked the actual questions on the form.

The wizard may pose a series of questions, and the next step to take—which could be to ask another question, another series of questions, no further questions, or some other action—may in part be determined based upon the prior responses provided by the user. The process may assist the user in understanding the form through helpful instructions as well as assist the applicant in filling in the appropriate response. It should be noted that the appropriate response may not always be obvious from the forms 210. Inserting an incorrect or ambiguous response may result in long delays and rejections in an application process with the government. The wizard may warn the user of answers that may be rejected. The wizard may in certain instances offer a selection of appropriate answers and assist the applicant in determining which response is appropriate. For example, if a government form asks the applicant if he has ever been convicted of a crime, the wizard may indicate to the user what constitutes a crime in the context of that form. If, for instance a driving violation constitutes a crime for a particular application, the wizard will assist the user in answering the form correctly. The wizard may in certain instances offer additional or clarifying questions not asked on the form. The wizard also may screen user information to sift through what is relevant to the form filling in process. If a user of the system 200 would like additional professional guidance regarding an application processed through the system 200, the system 200 may provide referral to, by way of non-limiting example, specialized immigration law counsel. Such referral may be an integrated part of the system 200, and may be accessed by the user at his or her discretion.

The actions of the wizard may be based upon the business rules 206 and the rules engine 204 which may execute the business rules 206.

In some instances, the government forms process may include a series of forms 210 that must be submitted in a proper sequence and at the proper time. The system 200 may have programmed therein, the form filing requirements and notices and reminders for the user of when to file the forms 210. The system 200 may also notify the user of what attachments and fees may be required for a complete and proper submission. The system 200 may also provide sample resumes, sample letters and other sample documents that are appropriate and helpful to the user. Based on the answers to the wizard questions, a status, benefit or visa selection may be made, the forms 210 may be determined, and the filing strategy may be identified and communicated to the user. In other words, the wizard may perform a total case management process for the application complete with notifications, docketing, and integration with government calendars. Any government rules changes that occur during the application process may be communicated to the user with instructions on what to do to be in compliance. In this regard, the system 200 may proactively notify a user of a situation that may require their attention. This notification may occur even when the user is not actively engaged with the system 200 and may be in the form of, by way of non-limiting example, a text message or email. For instance, there may be an upcoming increase in application fees, and the system 200 may actively notify the user that the user should expedite the completion of their application so it may be filed under the existing (i.e., old) fee structure.

The system 200 may be compatible with electronic verification systems such as E-verify® systems and the applicant may be able to set up a user name and password through the system so that the forms, when completed may be technically "from the applicant" even though submitted through the system. This may be important because many government agencies require that the actual applicant submit a particular form. By way of non-limiting example, the E-Verify® program may permit companies to directly submit their I-9 forms electronically to the government agency, and the system may have the ability to perform the electronic submission. The system 200 may in other cases not interface with government system. By way of non-limiting example, there is presently no electronic way to submit H-1B applications directly to a government agency. In such cases, the forms 210 may be printed out in a properly formatted and completed form, and sent through parcel post.

A user may interact with the system 200 via a number of client application types 212 including by way of non-limiting example, a web browser, a specially-built computer application running on a desktop personal computer, or a specially-built computer application running on a personal digital assistant. These client types 212 may utilize a number of methods to communicate with the Server Application 216. Client types 212 including "fat client" and applications built with a software development kit (SDK) may have the ability to provide a subset of the system's 200 functionality without having constant network communication between the client and the server, known as "offline usage". While these client's types 212 may have the ability to provide offline usage, the invention is not limited to client types 212 which may do so.

The system 200 methodology may include, in an embodiment, providing a network-based immigration service with a specialized user interface comprised of the following operations:
  a. providing an interactive questionnaire to determine forms requirements;
  b. using a wizard and decision tree analysis to determine a form filing strategy based on the answer to the questionnaire;
  c. accessing immigration-related forms in governmentally maintained forms databases, wherein the immigration-related forms include a plurality of fields;
  d. extracting a portion of the immigration application data from the relevant databases;
  e. completing at least one of the immigration-related forms, wherein fields are normalized within forms and mapping is maintained between fields and also providing guidance to the user to correct unacceptable answers and suggest more appropriate answers;
  f. submitting the immigration-related forms to a governmental entity, wherein the immigration-related forms are formatted based on rules associated with the governmental entity;
  g. sending updates to the immigration-related forms to a processor utilizing a network for processing and subsequent use; and
  h. displaying an activities interface to the user, wherein the activities interface identifies activities for users to complete, and governs the data collection process for completing the identified activities.

Exchanges from the databases maintained by the government may include by way of non-limiting example, forms, notices, and replies. Exchanges to the databases maintained by the government may include by way of non-limiting example, forms, applications, filings, petitions, corrections, cancellations, and status requests.

The end result may be the alignment of the proper forms 210, immigration forms 210 for example, and applications that may best meet the sets of criteria entered by the user. In addition, the specific methodology and uniqueness of the system 200 may speed up the processing of these forms 210 by retaining and applying standardized or required data across form types, thereby increasing accuracy, quality, and reliability within the immigration application process for both the applicant and the eventual U.S. government processing entity. The system 200 may provide an articulate conversation between a government agency and the applicant wherein the desired result is properly filled in forms 210 and the granting of the appropriate status, benefit, or visa.

The operation of the immigration application management system 200 is now described with reference to FIG. 3, which is an exemplary data-flow diagram 300 for a specific immigration application through in accordance with an embodiment of the present invention. A user (e.g., end customer 302) may access the system to correctly complete and file a government application that includes forms. By way of non-limiting example, a user may access the system 200 to apply for a temporary worker classification of visa.

The user may initiate a session (e.g., launch an application or access a portal 304) in the system 200. The system 200 may provide questions to the user, and the user may be requested to enter answers to those questions 306 into the system 200. The questions may relate to questions relevant to the government application. The system 200 may determine 308 whether the answers are optimal and would likely be acceptable 310 to a government entity that may ultimately receive and process the government application. The system 200 may provide guidance 308 to the user to correct any unacceptable answers or suggest one or more appropriate 310 answers. The process of receiving answers, determining if the answers will be acceptable, and providing guidance and suggesting answers may be iterative. The system 200 may also provide additional information to the user. With respect to the temporary working example, the system 200 may guide the user through the requirements for that classification. This requirement is communicated in an "exchange." Those requirements may include by way of non-limiting example, the requirement to advertise a position, the timing and the amount of fees paid, what forms must be submitted when and to whom, and other special instructions relevant to that particular visa classification. In providing such strategic guidance, the system 200 may have internalized within its system and method the decision rules and policy guidance used by immigration officials in making decisions about applications when they review them, thus ensuring that the user's final product better conforms to what immigration officials see as the standard for application approval. Examples of such rules and guidance include, but are not limited to: the Adjudicator's Field Manual, the Affirmative Asylum Procedures Manual, the E-Verify Employer Manual, the M-274 Handbook for Employers, the M-603 USCIS is Making Photos Simpler document, USCIS Policy and Procedural Memoranda on H1B Non-Immigrant Visas (Neufeld AC21 Memo, et al), USCIS Policy and Procedural Memoranda on Affidavit of Support and I-94, USCIS Policy and Procedural Memoranda on Adjustment of Status, RFE's, and Medical Requirements, USCIS Policy and Procedural Memoranda on E1 & E2 Non-immigrant Investor Visas, USCIS Policy and Procedural Memoranda on EB-5 Immigrant Investor Visas, USCIS Policy and Procedural Memoranda on L1 & Blanket L1 Non-immigrant Visas, USCIS Policy and Procedural Memoranda on I-140 Immigrant Visas, USCIS Policy and Procedural Memoranda on Citizenship, and the M-480 Naturalization Eligibility Worksheet.

The user of the system 200, then, may not only be asked for answers to the questions on the relevant application forms and answers to clarifying questions generated by the system 200 itself, but may also be provided with specific guidance regarding how answers given may be interpreted by immigration officials. For instance, the system 200 may flag for an applicant that although the current employment shown for a temporary worker classification may meet the technical requirements for such a classification, the larger work history of the applicant does not seem consistent with what is being presently claimed. Or, the system 200 may flag for an applicant the potential problem that his or her academic credentials are not easily convertible into US academic credentials, and therefore third party credential evaluation and translation should accompany the application. In addition, the system 200 may advise an applicant that the employer data presented in an application does not match that currently available through global commercial databases, a discrepancy that can significantly delay an application, generate cumbersome requests for evidence (RFE's) or even cause application denial.

Turning back to FIG. 3, the system 200 may use a decision tree analysis (e.g., the business rules 206 and the rules engine 204) to determine 312 a form filing strategy based on the answers 310. The system 200 may determine 314 whether any other documents are required or should be provided for the government application to improve its likelihood of acceptance. At this point, the system 200 updates and verifies current government rule compliance of the application and notifies user. The system determines whether the application is final and ready for submission 316 or requires editing 320. The system 200 may complete forms 210 based on the form filing strategy. When the application is complete and finalized, the system 200 may assist the user with properly filing 318 the forms and any other required documents.

Figure 4:
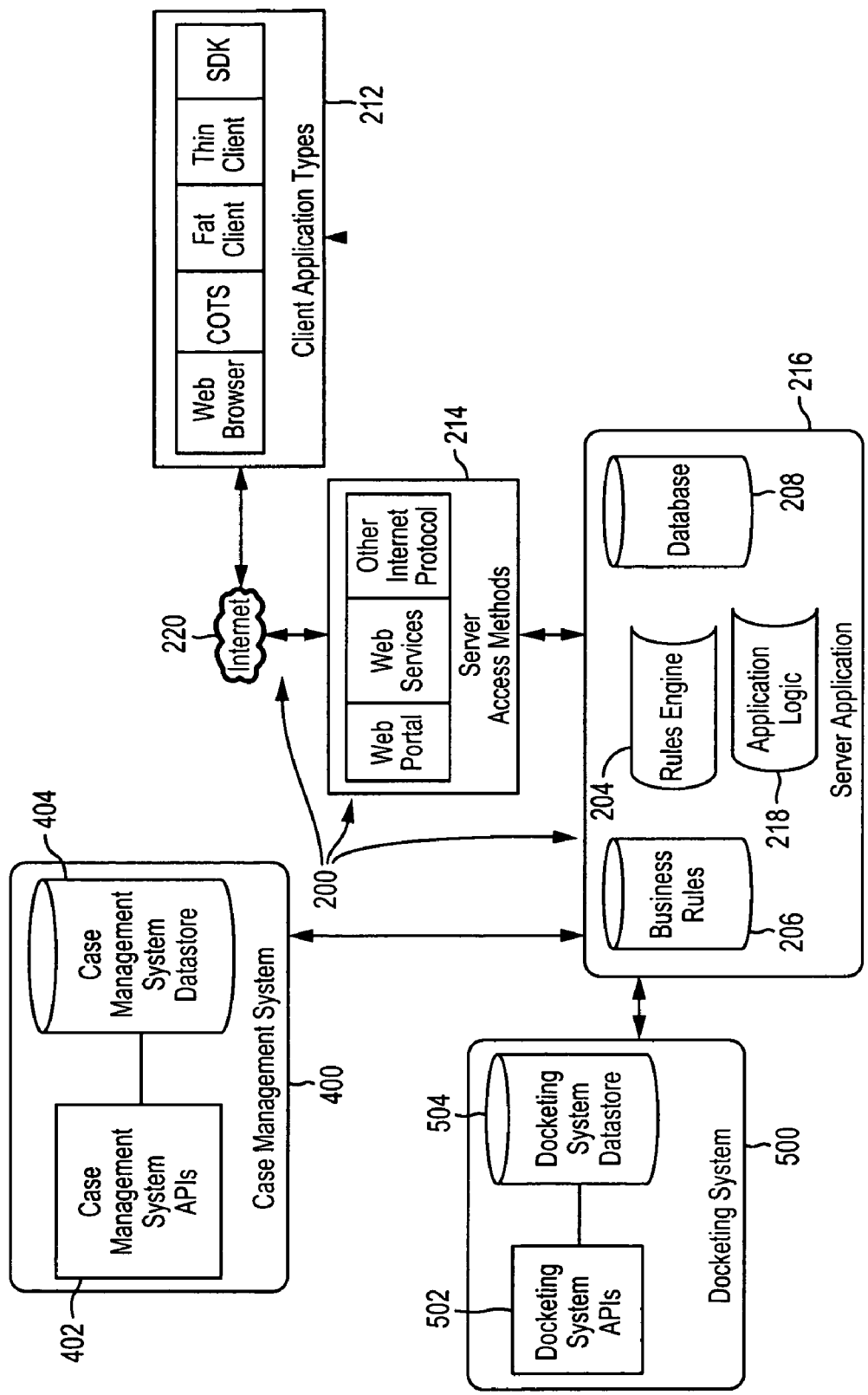
FIG. 4 is a schematic representation of the immigration application management system of FIG. 2 interoperating with a case management system and a docketing system in accordance with an embodiment of the present invention.

FIG. 4 is a schematic representation of the immigration application management system 200 of FIG. 2 interoperating with a case management system 400 and a docketing 500 in accordance with an embodiment of the present embodiment. For instance, many law firms may already have a case management system, but there may be no domain expertise embedded within the case management system. The immigration application management system 200 may be connected to the case management system 400 and the docketing system 500. The immigration application management system 200 may still utilize the herein discussed wizard methodology to help a user complete an application (i.e., perform its analysis and develop a strategy for the user to interface with a government agency), but then the immigration application management system 200 may pass all the completed form data to the case management system 400. That is, after the application has been completed, the application may then be sent to the case management system 400 or docketing system 500, which may become the system of record for that immigration application. This interoperability may be achieved by interfacing with the case management system application programming interfaces (APIs) 402 or the case management system datastore 404. Likewise, the interoperability with the docketing system 500 may be achieved by interfacing with the docketing system application programming interfaces (APIs) 502 or the docketing system datastore 504. In instances where applicant information or the application information already exists in the case management system 400 or docketing system 500, the immigration application management system 200 may interface with the case management system 400 or docketing system 500 to retrieve the applicant information or the application information. In addition, the immigration application management system 200 may receive and exchange messages from the case management system 400 or docketing system 500. Messages types may include alerts and notifications, which the system 200 may use as input into the rules engine 204.

Accordingly, immigration application management apparatus, systems, and methods are provided. One application of the apparatus, systems, and methods may be to speed the work of immigration professionals, such as immigrations attorneys. Another application of the apparatus, systems, and methods may be to assist businesses and individuals with filing and monitoring their own applications. Other applications and services may be developed using a software development kit (SDK) component of the apparatus, systems, and methods. Another application of the apparatus, systems, and methods may be to provide value-added services to customers. For example, human resources professionals in businesses may use the apparatus, systems, and methods to better interface with E-Verify, a U.S. government-run process for verify employment status. E-Verify (formerly known as the Basic Pilot/Employment Eligibility Verification Program) is an Internet-based system operated by the Department of Homeland Security in partnership with the Social Security Administration that allows participating employers to electronically verify the employment eligibility of their newly hired employees. Another application of the apparatus, systems, and methods may be to meet the societal goals of streamlined immigration application processing and backlog reduction.

Modifications of the above-disclosed embodiments of the present invention of which fall within the scope of the invention will be readily apparent to those of ordinary skill in the art. For instance, although in some embodiments, an immigration system for use by an individual is disclosed, alternative embodiments are contemplated and are considered to be within the scope of the present invention.

In one embodiment, a computer application may be provided to be used by businesses and individuals to provide them with an effective strategy for interfacing with governmental agencies such as the Social Security Administration, USCIS, and other Department of Homeland Security component entities that deal with immigration applications and petitions, and to assist them in executing that strategy. This strategy may include by way of non-limiting example, guidance on how to accurately answer specific questions on a status, benefit, or visa application; and suggested parallel, contingent activities to serve as a backup plan should the primary tact not achieve the desired results. Note that the strategy defined by the present invention may not be limited to instructions on where to mail a completed application, verifying that required fields are not null, etc., but also may include domain expertise about the immigration process which may not be found in any publication or manual, but provided by skilled professional knowledgeable in the field. Not only does this embodiment of the present invention make the application process better for the applicant and the immigration attorney, but the accuracy, completeness, and application strategy make the overall process more efficient for all involved parties, including the U.S. government.

In another embodiment, a computer application may be provided to be used by businesses and individuals to provide them with an effective strategy for interfacing with U.S. federal, state, and local governmental agencies, and to assist them in executing that strategy. Specialized domain expertise contained within with this embodiment may be incorporated into the analysis to develop a strategy specific to the applicant, their needs, and their situation.

In another embodiment, a computer application may be provided to be used by businesses and individuals to provide them with an effective strategy for interfacing with non-U.S. governmental entities, and to assist them in executing that strategy.

In another embodiment, a computer application may be provided that may be compatible with and assist with form submission relating to government registration of undocumented workers or persons.

In another embodiment of the invention, the path through the decision tree and the questions the wizard asks may change depending upon cultural factors associated with a language, dialect, or locale. For example, in some cultures the definition of a family member may include individuals that would not be considered to be family members under relevant United States law, or do not consider siblings they have disowned to be family members. When asking the applicant a question about their family, the invention keys off previous responses, such as the applicant's primary language. Should there be a potential discrepancy in the definition of family member, the invention then informs the applicant that the question applies only and to all individuals with whom they are related under relevant United States law certain operations are shown as occurring at particular times relative to other operations, the operations may occur at other times.

Figure 3:
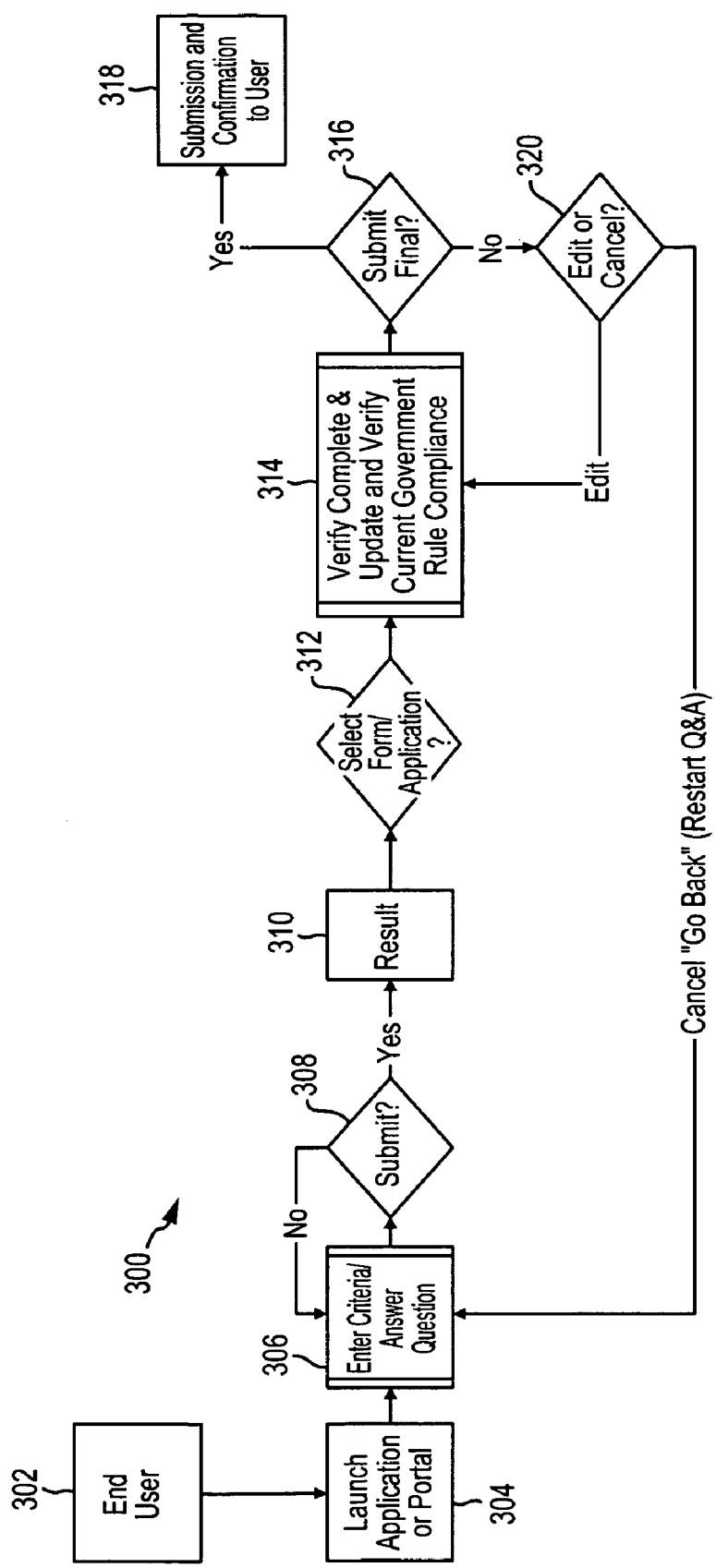
FIG. 3 is an exemplary data-flow diagram for a specific immigration application in accordance with an embodiment of the present invention.

The components of the exemplary embodiments of FIGS. 2-4 are for exemplary purposes, as many variations of the specific hardware used to implement the exemplary embodiments are possible, as will be appreciated by those skilled in the relevant arts. By way of non-limiting example, the functionality of one or more of the components of the exemplary embodiments of FIGS. 2-4 can be implemented via one or more programmed computer systems or devices, including server computers, client computers, and the like.

To implement such variations as well as other variations, a single computer system can be programmed to perform the special purpose functions of one or more of the components of the exemplary embodiments of FIGS. 2-4. On the other hand, two or more programmed computer systems or devices can be substituted for any one of the components of the exemplary embodiments of FIGS. 2-4. Accordingly, principles and advantages of distributed processing, such as redundancy, replication, and the like, also can be implemented, as desired, to increase the robustness and performance of the components of the exemplary embodiments of FIGS. 2-4.

The components of the exemplary embodiments of FIGS. 2-4 can store information relating to various processes described herein. This information can be stored in one or more memories, such as a hard disk, optical disk, magneto-optical disk, RAM, and the like, of the components of the exemplary embodiments of FIGS. 2-4. One or more databases of the components of the exemplary embodiments of FIGS. 2-4 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 2-4 can include appropriate data structures for storing data collected and/or generated by the processes of the components of the exemplary embodiments of FIGS. 2-4 in one or more databases thereof.

All or a portion of the components of the exemplary embodiments of FIGS. 2-4 can be conveniently implemented using one or more general purpose computer systems, microprocessors, digital signal processors, micro-controllers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the components of the exemplary embodiments of FIGS. 2-4 can be implemented on the World Wide Web. In addition, the components of the exemplary embodiments of FIGS. 2-4 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the components of the exemplary embodiments of FIGS. 2-4 can include computer readable storage media or memories for holding instructions programmed according to the teachings of the present invention and for holding data structures, tables, records, and/or other data described herein. Computer readable storage media can include any suitable medium that participates in providing instructions to a processor for execution. Such a medium can take many forms, including but not limited to, non-volatile media, volatile media, transmission media, and the like. Non-volatile media can include, by way of non-limiting example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable storage media can include, by way of non-limiting example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

Accordingly, although embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-implemented immigration application management method comprising:
   providing computer readable storage medium containing executable software code for performing the steps of:
   a. providing one or more questions on a computerized display device to a user wherein said one or more questions relate to questions relevant to a government application, and requesting one or more answers corresponding to the one or more questions;
   b. determining whether the one or more answers are optimal and would likely be acceptable to a government agency ultimately to receive the government application, and that the one or more answers will likely not result in a rejection or return of the government application;
   c. providing guidance to the user to correct any unacceptable answers or suggest one or more appropriate answers;
   d. using a decision tree analysis to determine a form filing strategy based on the one or more answers;
   e. determining whether any other documents are required for or should be filed with the government application;
   f. completing one or more forms based on the form filing strategy; and
   g. assisting the user with properly filing the forms and any other required documents.

2. The computer-implemented method of claim 1, wherein the assisting the user with properly filing comprises assisting the user in complying with time requirements related to said form filing.

3. The computer-implemented method of claim 1, wherein said government application is an immigration, status, benefit or visa application, form, or petition.

4. The computer-implemented method of claim 1, wherein the assisting the user with properly filing comprises submitting the forms and any other related documentation and fees to the government agency via the Internet.

5. The computer-implemented method of claim 4, wherein government agency receives the forms and any other documentation via a computerized system.

6. The computer-implemented method of claim 1, wherein one or more of determining whether the one or more answers are acceptable and providing guidance to the user include considering rules and policy considerations used by the government agency.

7. The computer-implemented method of claim 1, wherein one or more of determining whether the one or more answers are acceptable and providing guidance to the user include verifying data with a third-party data provider.

8. The computer-implemented method of claim 1, wherein said one or more answers are normalized in corresponding fields.

9. The computer-implemented method of claim 1, further comprising obtaining one or more of a government status, benefit, document or award via the filing of completed forms.

10. The computer-implemented method of claim 1, wherein the decision tree strategy determines one or more of: type of application, forms required, attachments, fees, timing and sequence of submission.

11. The computer-implemented method of claim 1, wherein said government application is a government regularization or government registration.

12. The computer-implemented method of claim 1, further comprising providing the user with a proof of filing receipt after the filing of said forms and documents.

13. The computer-implemented method of claim 1, wherein said computer-implemented method utilizes a data base, computer readable storage medium, rules engine, computer software and a server.

14. The computer-implemented method of claim 1, wherein a computer wizard is implemented with the method.

15. The computer-implemented method of claim 1, wherein said step of assisting the user with properly filing the forms and any required documents includes assisting the user with filing using an electronic verification system.

16. The computer-implemented method of claim 1, further comprising providing exchanges between the user and the government agency before and after the filing of the forms.

17. The computer-implemented method of claim 16, wherein said exchanges include filing deadlines.

18. The computer-implemented method of claim 16, wherein said exchanges include notifying said user of rule changes and information relevant to said application.

19. A computer-implemented government application management method comprising:
   providing computer readable storage medium containing executable software code for performing the steps of
   a. providing one or more questions on a computerized display device to a user wherein said one or more questions relate to questions relevant to a government application, and requesting one or more answers corresponding to the one or more questions;
   b. determining whether the one or more answers are optimal and would likely be acceptable to a government agency ultimately to receive the government application, and that the one or more answers will likely not result in a rejection or return of the government application;
   c. providing guidance to the user to correct any unacceptable answers or suggest one or more appropriate answers;
   d. using a decision tree analysis to determine a form filing strategy based on the one or more answers;
   e. determining whether any other documents are required for or should be filed with the government application;
   f. completing one or more forms based on the form filing strategy; and
   g. assisting the user with properly filing the forms and any other required documents.

20. The computer-implemented government application management method of claim 19, wherein said government application is an application for one or more of a passport, change of address, individual taxpayer identification number, employer identification number, request for birth certificate, request for marriage certificate, social security number, social security benefit, immigration appointment, immigration status, zoning, driver's license, vehicle document, award or contract.

21. A system for assisting a user with properly filing a government form (s) and any other required documents to obtain status, benefit, visa, award or paper comprising executing the method of claim 19 via a computer that is linked to a website and to the government.

* * * * *